2,874,152

POLYMERIZATION PROCESS EMPLOYING A PERFLUOROCHLOROCARBOXYLIC ACID AS AN EMULSIFYING AGENT

Archibald N. Bolstad, Maplewood, and Ralph L. Herbst, Jr., Westfield, N. J., assignors, by mesne assignments, to Minnesota Mining and Manufacturing Company, St. Paul, Minn., a corporation of Delaware No Drawing. Application October 18, 1954
Serial No. 463,073

8 Claims. (Cl. 260—92.1)

This invention relates to the manufacture of fluorine-containing polymers. More particularly, the invention relates to the polymerization of perhaloolefins such as chlorotrifluoroethylene in the presence of an aqueous suspension medium to produce a normally solid polymer of high physical and chemical stability.

Various olefins containing fluorine may be polymerized under suitable conditions to produce polymers in the form of liquids, waxes, or solids, and under suitable reaction conditions chlorotrifluoroethylene, for example, polymerizes to produce useful polymer in a range of molecular weights. These polymers are relatively inert chemically and have generally good physical properties. The oily polymer of chlorotrifluoroethylene may be used as a lubricant or insulating medium. The waxes of chlorotrifluoroethylene are also useful in the preparation of lubricating compositions and as impregnants for various materials. The solid polymer of chlorotrifluoroethylene in the high molecular weight range has the characteristics of a thermoplastic and is useful for a variety of purposes for which plastics may be employed.

It is conventional practice to polymerize perhaloolefins such as chlorotrifluoroethylene using water suspension type catalyst systems, for example, a redox catalyst system, this system including an oxidant and a reductant. The oxidant is generally an inorganic persulfate, and the reductant is generally a bisulfite. In these systems, it is also conventional practice to include a variable valence metal salt, such as ferrous sulfate or ferrous nitrate, which is employed as an activator. However, the use of such variable valence metal salts is undesirable for a number of reasons. One of the primary reasons such salts are undesirable is that the activator cation, such as the ferrous ion, contaminates the polymer product with the result that the final pressed polymer sheets are often discolored. The pressed sheets may range in color from tan to brown and may be spotted, whereas it is desired to produce sheets which are completely colorless.

In our copending application Serial No. 463,072, filed October 18, 1954, there is disclosed a process in which a substituted ethylene containing at least two fluorine atoms, and preferably at least one fluorine atom per carbon atom of the aliphatic portion of the substituted ethylene, is polymerized in an aqueous suspension type catalyst system, which is preferably a redox catalyst system comprising an oxidant and a reductant but in the absence of a variable valence metal salt, and employing a perfluorochlorocarboxylic acid as an emulsifying agent.

In accordance with the present invention, a substituted ethylene containing at least two fluorine atoms, preferably at least one fluorine atom per carbon atom of the aliphatic portion of the substituted ethylene, is polymerized in an aqueous suspension type catalyst system, which is preferably a redox catalyst system comprising an oxidant but in the absence of both a reductant and a variable valence metal salt, and employing a perfluorochlorocarboxylic acid as an emulsifying agent. The process of the invention produces polymers having better color, i. e., absence of color, in higher yields than does the process of our copending application Serial No. 463,072, filed October 18, 1954. The polymers may be either liquids, waxes, or solids, the process being effected in either a batchwise or continuous manner.

The monomer is admixed with the aqueous suspension medium in a polymerization zone which is maintained under the appropriate conditions of polymerization and under sufficient pressure to maintain the aqueous solution as a liquid under the polymerization conditions. The monomer and water are agitated by suitable means in the reaction zone in order to intimately disperse the monomer and the aqueous suspension medium. The monomer and the polymer produced are both substantially insoluble in the aqueous dispersion medium; hence, the separation of the polymer from the water phase may be effected by settling and decantation, by filtering, by centrifuging, by evaporation of the aqueous phase, or by other conventional means known to the art, depending upon whether the polymer is in the liquid or solid state.

The present invention is particularly applicable to the polymerization of perfluorochloroolefins such as chlorotrifluoroethylene, but the polymerization of various other halogenated olefins is also contemplated. These olefins include, for example, perfluorobutadiene, perfluoropropene, phenyltrifluoroethylene, alpha methyl phenyl difluoroethylene, perfluoroacrylonitrile, perfluorocyclobutadiene, tetrafluoroethylene, vinylidene fluoride, trifluoroethylene, and difluorodichloroethylene. The invention applies to the copolymerization of these and other monomers, as well as to their homopolymerization. For example, the invention applies to the copolymerization of chlorotrifluoroethylene and tetrafluoroethylene, chlorotrifluoroethylene and vinylidene fluoride, chlorotrifluoroethylene and vinyl fluoride, chlorotrifluoroethylene and vinyl chloride, chlorotrifluoroethylene and vinylidene chloride, chlorotrifluoroethylene and perfluoropropene, chlorotrifluoroethylene and trifluoroethylene, and perfluorobutadiene and butyl acrylate. In copolymerization reactions the second monomer preferably is also a fluorinated olefin containing at least two fluorine atoms per molecule. When less than 5 weight percent of comonomer is employed, the term copolymerization is included within the broad term homopolymerization.

The quantity of water employed as the aqueous suspension medium may be from 100 to 800 parts by weight of water per 100 parts by weight of total monomer originally present in the reaction zone. Preferably, the quantity of water is from 100 to 300 parts by weight per 100 parts by weight of total monomer initially present in the reaction zone.

The temperatures employed in the polymerization may be between 0° and 100° C. and preferably are between 5° and 50° C. Operation at low temperatures of polymerization represents another unique aspect of the present invention, since heretofore when redox catalyst systems were employed, in the absence of a variable valence metal salt, it has been necessary to operate at temperatures in excess of 50° C. to obtain high yields.

The reaction pressure may be between 50 and 1200 p. s. i. g. with autogenous pressure, i. e., about 50 to 250 p. s. i. g., being preferred.

The polymerization time may be between about 5 hours and 5 days, with a time of 15 to 25 hours being preferred.

The pH of the reaction mixture may be between 3 and 13 and is preferably between about 6 and 10. Operation in the alkaline pH range represents another novel feature of the invention, since heretofore when employing redox catalyst systems, the common operating pH range was 1.5 to 2.5, which resulted in rapid corrosion of stainless steel equipment with attendant contamination of the polymer product.

The oxidants or promoters which are employed in the process of the present invention are inorganic peroxy compounds, such as sodium carbonate peroxide, sodium pyrophosphate peroxide, sodium persulfate, ammonium persulfate, potassium persulfate, sodium perborate, and the like. These oxidants or promoters may be present in a ratio of 1 to 6 parts by weight per 100 parts of total monomer initially present and are preferably employed in a ratio of 1 to 3 parts by weight per 100 parts by weight of total monomer initially present.

A buffer or other alkaline material may be employed to adjust the pH of the system to any value within the desired range. Examples of suitable buffers are sodium tetraborate, sodium orthophosphate, sodium acetate, ammonium carbonate, sodium acetate-acetic acid, and the like.

The emulsifying agents employed in the present invention are the perfluorochlorocarboxylic acids and derivatives thereof, having from 6 to 20 carbon atoms. When used as emulsifiers, the acids are preferably employed in the form of their salts, such as the sodium, potassium, and ammonium salts, but there are additional derivatives of the acids, such as esters and the like, as hereafter disclosed, which may also be employed.

The perfluorochlorocarboxylic acids may be employed in a weight ratio of 0.015 to 30 parts per 100 parts of total monomer initially present in the polymerization zone and preferably are employed in a ratio of 1.0 to 10 parts per 100 parts of total monomer initially present.

The perfluorochlorocarboxylic acids may be produced in a variety of ways. For example, they may be produced by subjecting perhalogenated aliphatic olefins, having at least 7 carbon atoms and being at least half fluorinated, to oxidation conditions in the presence of a vigorous oxygen-containing oxidation reagent, such as free oxygen in the presence of ultra violet light, free oxygen in the presence of ultra violet light and elemental chlorine, free oxygen in the presence of elemental fluorine, and permanganate salts in a liquid medium. Preparation of the acids according to this method is disclosed in copending application Serial No. 452,706, filed August 27, 1954.

The acids may also be prepared by subjecting aliphatic perhalogenated high polymers to thermal cracking conditions to produce lower molecular weight materials in the oil and wax range and subjecting the lower molecular weight materials to oxidation at a temperature not higher than about 10° C. in the presence of a permanganate salt in a liquid medium. Processes of this type are disclosed in copending application Serial No. 452,704 filed August 27, 1954.

Another method for the preparation of perfluorochlorocarboxylic acids useful in the present invention comprises treating fluorine-containing telomers, having the formula $$M(CF_2-CX_1X_2)_nBr$$

in which M is a perhalomethyl radical having a total atomic weight not higher than 146.5, $X_1$ and $X_2$ are fluorine or chlorine atoms, and $n$ is an integer from 2 to 16, with fuming sulfuric acid at a temperature of at least 125° C. This process produces carboxylic acids having the formula $$Z(CF_2-CFCl)_{n-1}CF_2COOH$$

in which Z is a perhalomethyl radical having a total atomic weight not in excess of 146.5 and $n$ is an integer from 2 to 16. The preparation of these acids is disclosed in copending application Serial No. 452,703, filed August 27, 1954, now Patent No. 2,806,865.

Acids useful in the process of the invention may also be prepared by hydrolysis of other telomers such as that produced by telomerizing perhaloolefins using sulfuryl chloride as a telogen, these telomers having the formula $$Cl(CF_2-CX_1X_2)_nCl$$

in which $X_1$ and $X_2$ are fluorine or chlorine atoms and $n$ is an integer from 2 to 16. Hydrolysis of these telomers produces monocarboxylic acids having the formula $$Cl(CF_2-CX_1X_2)_{n-1}CF_2COOH$$

in which $X_1$, $X_2$, and $n$ are as given above. The preparation of these acids are disclosed in copending application Serial No. 452,705, filed August 27, 1954, now Patent No. 2,806,866.

The preferred perfluorochlorocarboxylic acids of the invention are those acids having from 8 to 12 carbon atoms, prepared by the sulfuric acid hydrolysis of the telomerization product of chlorotrifluoroethylene and sulfuryl chloride, as described in copending application Serial No. 452,705, filed August 27, 1954, now Patent No. 2,806,866. These acids have the formula $$Cl(CF_2-CFCl)_nCF_2COOH$$

in which $n$ is an integer from 2 to 9.

One group of derivatives of these acids which also may be employed as emulsifiers in the process of the invention has the formula $$X_1(CF_2-CFCl)_nCF_2(CH_2)_mR$$

in which $X_1$ is fluorine, chlorine, or bromine, $n$ is an integer from 2 to 9, R is a solubilizing group, and $m$ is 0 or 1 and is 0 only when R contains a $$-\overset{\overset{\text{O}}{\|}}{\text{C}}-\text{O}-$$

group. Other compounds of this type are those having the formula $$X_1(CF_2-CFCl)_{n-1}CF_2(CH_2)_mR$$

in which $X_1$ is a perhalomethyl radical having a total atomic weight not in excess of 146.5, and $n$, $m$, and R are as given above. The R above, in addition to a —COOH group or a —COOM group, in which M is an alkali metal or ammonium radical, may be a hydrophilic group such as a phosphoric acid group $$-\text{OPO(OM)}_2$$

or a sulfuric acid group, $-OSO_3(OM)$, where M is hydrogen, alkali metal, ammonium, or substituted ammonium; a phosphonic acid group, $-PO(OM)_2$, where M is a as above; or an amine group, e. g., $-NH_2$ or $-NR_2$, where R is alkyl, present as a salt or as a quaternary ammonium compound.

In preparing esters of the above-described carboxylic acids, it is necessary to reduce the acid to the alcohol and then react the alcohol with an acid to produce the esters, according to general esterification principles. The perfluorochloroalkyl amines may be prepared by reduction of the corresponding perfluorochloroalkanoic acid amides, the reducing agent preferably being lithium aluminum hydride used in an anhydrous medium such as absolute ether.

In the preparation of the esters, for example, the reduction of the acid to the alcohol results in a $CH_2$ group being positioned adjacent to the solubilizing group, as shown in the formulas above. This $CH_2$ is present only when the acid is reduced, i. e., when the acid itself is employed or when the acid salts are employed, there is no $CH_2$ group present.

Among the other advantages of the process of the present invention is the fact that high yields at low temperatures of polymerization are realized. Also, stable latices are formed which minimizes polymer build-up on the walls of the reactor and discharge areas, thereby facilitating handling and discharge of the polymer product. The polymer is also easily "wetted" with water, thereby facilitating cleanup of the polymer product.

An additional advantage of using the perfluorochlorocarboxylic acids of the invention as dispersing or emulsifying agents, results from the fact that the perfluorochlorocarboxylic acid having 8 carbon atoms and prepared by the sulfuric acid hydrolysis of the telomerization product of chlorotrifluoroethylene and sulfuryl chloride, for example, is soluble in water. This is a useful property, since when polymerization is complete, the latex is coagulated by adding an electrolyte, such as magnesium chloride, magnesium sulfate, aluminum sulfate, concentrated hydrochloric acid, sodium chloride, sodium chloride-sulfuric acid, and the like. Prior to coagulation, the latex is heated to a temperature of 75 to 80° C. and is then coagulated by the addition of magnesium chloride accompanied by vigorous agitation or the latex may be coagulated by freezing. The coagulated polymer is then filtered while hot. The magnesium salt of $$Cl(CF_2—CFCl)_3CF_2COOH$$

is soluble in hot water, and thus the coagulated polymer is conveniently and efficiently freed of the magnesium salt of the acid by washing the polymer with hot water. Cooling the filtrate precipitates the magnesium salt of $$Cl(CF_2—CFCl)_3CF_2COOH$$

and acidification of the magnesium salt regenerates the free acid which can then be recycled to the polymerization zone.

Further, it has been found that the polymers produced by the process of the invention are less susceptible to thermal degradation than those produced in mass polymerization systems, being comparable to pigmented polymers in this regard.

Finely divided solids may also be dispersed in the liquid phase of the polymerization reaction mixture as a suspension for the purpose of acting as fillers for the polymer product and for the additional purpose of forming nuclei for the initiation of the polymerization reaction.

The process of the invention also produces polymer products of very high molecular weight, as determined by the no strength temperature (N. S. T.) or 0.75 percent solution viscosity. A no strength temperature (N. S. T.) of between about 210° C. and 350° C. is characteristic of a normally solid polymer of chlorotrifluoroethylene having thermoplastic characteristics. The best plastic characteristics of the normally solid polymer are observed at N. S. T. values between about 240° C. and about 340° C.

The no strength temperature (N. S. T.) is determined in the following manner: A thermoplastic sample of polychlorotrifluoroethylene is hot pressed into a 1/16 inch thick sheet and cut into a strip measuring 1/8 inch x 1/16 inch x 1 5/8 inches. The strip is notched 5/8 inch from the top so that the dimension at the notch is 1/16 inch x 1/16 inch. A fine wire and a standard weight are attached to one end of the strip, the weight of the polymer and the wire being 0.5 gram. The strip is then attached vertically in a furnace, and the temperature of the sample is increased at a rate of about 1.5° C. per minute as the breaking temperature is approached. The no strength temperature is the breaking temperature of the sample, and differences of about 5° C. are considered significant.

Another method for measuring the molecular weight of polymers is the solution viscosity of a 0.75 percent by weight solution of the polymer in a 3,5-dichlorobenzotrifluoride solvent. This solution viscosity is measured in centistokes, and a viscosity of 0.64 centistoke is equivalent to an N. S. T. of 230. Thus, it will be seen that in the following examples, polymers were produced according to the method of the invention having very high solution viscosities and, therefore, very high molecular weights.

The invention will be further illustrated by reference to the following specific examples in which all parts are by weight:

EXAMPLE 1

This example illustrates the polymerization of chlorotrifluoroethylene using a persulfate- $$Cl(CF_2—CFCl)_3CF_2COOH$$

acid promoter system.

The polymerization was conducted using the following recipe:

| | Parts by weight |
|---|---|
| Water, deionized | 300.0 |
| $CF_2=CFCl$ | 100.0 |
| Potassium persulfate | 1.0–4.0 |
| $Cl(CF_2—CFCl)_3CF_2COOH$ | 2.4 |

A series of runs was carried out in a stainless steel polymerization bomb. In each run the vessel was charged with 300 parts by weight of deionized water, an amount of potassium persulfate as given in Table I below, 2.4 parts of $Cl(CF_2—CFCl)_3CF_2COOH$, enough potassium hydroxide to bring the pH value of the mixture to that given in Table I, and 100 parts by weight of chlorotrifluoroethylene. The bomb was frozen in a solid carbon dioxide-acetone bath after the addition of each ingredient and the chlorotrifluoroethylene was added by flash distilling into the bomb. The closed bomb was tumbled for a period of 20 hours at the temperature indicated in Table I; the bomb was then vented to atmospheric pressure and opened. The polychlorotrifluoroethylene latex was coagulated by freezing at a temperature between about 0° and 1° C., the coagulated polymer was filtered, washed thoroughly with hot water and then dried to constant weight at 190° C.

The results are as follows:

*Table I*

| Run No. | $K_2S_2O_8$ (parts by weight) | Initial pH | Temperature, ° C. | Percent yield | 0.75% solution viscosity (cs.) |
|---|---|---|---|---|---|
| 1 | 2.0 | 7 | 30 | 58.8 | 1.021 |
| 2 | 2.0 | 7 | 30 | 48.0 | 1.044 |
| 3 | 2.0 | 12 | 30 | 69.4 | 0.957 |
| 4 | 2.0 | 12 | 30 | 64.4 | 0.996 |
| 5 | 1.0 | 7 | 30 | 22.0 | 1.079 |
| 6 | 1.0 | 7 | 30 | 27.4 | 1.141 |
| 7 | 4.0 | 7 | 30 | 47.1 | 1.062 |
| 8 | 4.0 | 7 | 30 | 65.0 | 1.088 |
| 9 | 2.0 | 7 | 20 | 15.3 | 1.759 |
| 10 | 2.0 | 7 | 20 | 18.2 | 1.614 |
| 11 | 4.0 | 7 | 20 | 6.0 | 1.327 |
| 12 | 4.0 | 7 | 20 | 17.5 | 1.739 |
| 13 | 4.0 | 12 | 20 | 34.1 | 1.346 |
| 14 | 4.0 | 12 | 20 | 34.5 | 1.554 |

Two runs were made using the following persulfate-bisulfite - $Cl(CF_2—CFCl)_3CF_2COOH$ acid promoter system.

| | Parts by weight |
|---|---|
| Water, deionized | 300.0 |
| $CF_2=CFCl$ | 100.0 |
| Potassium persulfate | 2.0 |
| Sodium bisulfite | 1.1 |
| $Cl(CF_2—CFCl)_3CF_2COOH$ | 2.4 |

Each run was carried out in a stainless steel polymerization bomb. In each run the vessel was charged with 300 parts by weight of deionized water, 2.0 parts of potassium persulfate, 1.1 parts of sodium bisulfite, 2.4 parts of $Cl(CF_2—CFCl)_3CF_2COOH$, enough potassium hydroxide to bring the pH of the mixture to that given in Table II below, and 100 parts of chlorotrifluoroethylene. The bomb was frozen in a solid carbon dioxide-acetone bath after the addition of each ingredient and the chlorotrifluoroethylene was added by flash distilling into the bomb. The closed bomb was tumbled for a period of 20 hours at a temperature of 20° C.; the bomb was then vented to atmospheric pressure and opened. The latex was coagulated and dried as described above.

The results are as follows:

Table II

| Run No. | Initial pH | Temperature, °C. | Percent yield | 0.75% solution viscosity (cs.) |
|---|---|---|---|---|
| 1 | 7 | 20 | 5.3 | 1.977 |
| 2 | 7 | 20 | 5.3 | 1.967 |

Comparison of the yields obtained in run Nos. 9 and 10 of Table I with the yields obtained in run Nos. 1 and 2 of Table II shows that under the same reaction conditions higher yields are obtained when the polymerization is conducted using the improved bisulfite-free promoter system of this invention.

EXAMPLE 2

Quantitative color data were obtained on pressed sheets of polychlorotrifluoroethylene prepared in a persulfate-bisulfite polymerization system in accordance with the procedure of copending application Serial No. 463,072, filed October 18, 1954, for comparison with data obtained on pressed sheets prepared using the persulfate system in the absence of bisulfite in accordance with the present invention. The data were obtained by comparing ⅛ inch pressed sheets of polychlorotrifluoroethylene with standards in a Hellige comparator, model 605. A higher rating number indicates a darker pressed sheet. Table III below contains the color ratings of polymers prepared in the persulfate-bisulfite system, and Table IV contains the ratings of polymers prepared in the persulfate system of the present invention.

Table III
POLYMER PREPARED IN PERSULFATE-BISULFITE SYSTEM

Run No.: Rating
1 ——— 4
2 ——— 4
3 ——— 4
4 ——— 3
5 ——— 3

Table IV
POLYMER PREPARED IN PERSULFATE SYSTEM

No. of run as given in Table I above: Rating
1 ——— 2
6 ——— 2
8 ——— 2

It will be seen from a comparison of the above data that the polymer samples prepared using the process of the present invention had a better color rating than did those prepared using a persulfate-bisulfite polymerization system.

EXAMPLE 3

The various runs of this example were conducted in order to study the effect of varying the temperature (15°, 20°, and 25° C.), type of acid ($C_6$ and $C_8$ perfluorochlorocarboxylic acid having the formula $$Cl(CF_2-CFCl)_n CF_2COOH$$

where $n$ is 2 or 3), and buffers and pH adjusting materials (KOH, borax, and sodium orthophosphate) on the yield and solution viscosity of the polychlorotrifluoroethylene obtained using the persulfate-perfluorochlorocarboxylic acid system.

All of the runs were carried out using 300 parts by weight of water, 100 parts of $CF_2=CFCl$, and 2.0 parts of potassium persulfate. In each run, the potassium salt of the perfluorochlorocarboxylic acid was formed by neutralizing the acid with potassium hydroxide. When potassium hydroxide is listed as the pH adjusting material, it was added only in an amount sufficient to neutralize the acid. In the runs in which the buffers, borax and $Na_2HPO_4$, were used, each was added in an amount equivalent to 2.4 parts by weight, based on the weight of monomer. The initial pH values were not measured. Each run was conducted for 20 hours using the same general procedure described in Example 1 above, except that the polymer latex was coagulated using magnesium chloride.

The results are in the following Table V.

Table V
TEMPERATURE, 15° C.

| No. | Telomer acid | Telomer acid (parts by weight) | Buffer | Percent yield | 0.75% solution viscosity (cs.) |
|---|---|---|---|---|---|
| 1 | $C_6$ | 0.30 | Borax | 0.72 | 1.153 |
| 2 | $C_6$ | 2.25 | $Na_2HPO_4$ | 0.96 | 1.506 |
| 3 | $C_6$ | 0.75 | do | 0.96 | 1.300 |
| 4 | $C_6$ | 2.25 | KOH | 1.49 | 1.822 |
| 5 | $C_6$ | 2.25 | Borax | 9.35 | 3.70 |
| 6 | $C_6$ | 0.30 | $Na_2HPO_4$ | 0.48 | 1.386 |
| 7 | $C_6$ | 0.30 | KOH | 0.22 | 1.023 |
| 8 | $C_6$ | 0.75 | Borax | 0.72 | 1.033 |
| 9 | $C_8$ | 0.75 | do | 2.88 | 2.586 |
| 10 | $C_8$ | 0.30 | $Na_2HPO_4$ | 2.28 | 2.016 |
| 11 | $C_8$ | 2.25 | KOH | 0.24 | 1.353 |
| 12 | $C_8$ | 0.75 | $Na_2HPO_4$ | 1.44 | 2.131 |
| 13 | $C_8$ | 0.30 | Borax | 1.20 | 2.087 |
| 14 | $C_8$ | 2.25 | $Na_2HPO_4$ | 7.81 | 3.884 |
| 15 | $C_8$ | 0.75 | KOH | 0.96 | 0.943 |

TEMPERATURE, 20° C.

| 1 | $C_6$ | 0.75 | KOH | 0.72 | 1.033 |
| 2 | $C_6$ | 0.30 | do | 1.44 | 1.166 |
| 3 | $C_6$ | 0.75 | $Na_2HPO_4$ | 1.20 | 1.191 |
| 4 | $C_6$ | 2.25 | do | 17.50 | 1.896 |
| 5 | $C_6$ | 0.30 | do | 1.68 | 1.178 |
| 6 | $C_6$ | 0.75 | do | 3.60 | 1.788 |
| 7 | $C_6$ | 2.25 | Borax | 1.68 | 1.392 |
| 8 | $C_8$ | 0.30 | do | 1.44 | 1.203 |
| 9 | $C_8$ | 0.75 | do | 4.82 | 1.538 |
| 10 | $C_8$ | 0.30 | $Na_2HPO_4$ | 3.48 | 1.479 |
| 11 | $C_8$ | 2.25 | Borax | 19.55 | 2.055 |
| 12 | $C_8$ | 2.25 | KOH | 14.40 | 2.41 |
| 13 | $C_8$ | 0.75 | do | 2.81 | 1.695 |
| 14 | $C_6$ | 0.30 | do | 1.03 | 0.865 |
| 15 | $C_8$ | 0.30 | Borax | 3.00 | 1.400 |
| 16 | $C_6$ | 0.75 | do | 2.35 | 1.134 |
| 17 | $C_6$ | 2.25 | $Na_2HPO_4$ | 2.54 | 1.333 |

TEMPERATURE, 25° C.

| 1 | $C_6$ | 0.30 | $Na_2HPO_4$ | 3.74 | 0.838 |
| 2 | $C_6$ | 0.75 | Borax | 6.12 | 0.895 |
| 3 | $C_8$ | 2.25 | do | 42.7 | 1.143 |
| 4 | $C_8$ | 0.75 | $Na_2HPO_4$ | 12.84 | 1.151 |
| 5 | $C_8$ | 0.30 | Borax | 8.28 | 1.030 |
| 6 | $C_6$ | 0.75 | do | 12.90 | 1.135 |
| 7 | $C_6$ | 0.75 | $Na_2HPO_4$ | 5.40 | 0.959 |
| 8 [1] | $C_6$ | 2.25 | do | 41.4 | 1.171 |
| 9 | $C_6$ | 2.25 | do | 7.44 | 0.959 |
| 10 | $C_8$ | 0.30 | KOH | 3.00 | 0.928 |
| 11 | $C_8$ | 2.25 | do | 25.53 | 1.638 |
| 12 | $C_6$ | 0.75 | do | 2.16 | 0.833 |
| 13 | $C_6$ | 0.30 | do | 1.08 | 0.764 |
| 14 | $C_8$ | 0.30 | $Na_2HPO_4$ | 6.36 | 1.193 |
| 15 | $C_8$ | 2.25 | KOH | 3.24 | 0.92 |
| 16 | $C_6$ | 0.30 | Borax | 3.72 | 0.943 |
| 17 | $C_8$ | 0.75 | KOH | 7.32 | 1.299 |
| 18 | $C_6$ | 2.25 | Borax | 5.16 | 1.091 |

[1] The N.S.T. value as measured for this sample of polychlorotrifluoroethylene was 300.

The above data show that there is a uniform effect of temperature upon the yield for both of the acids employed for all of the buffers and pH adjusters employed and all of the acid concentrations employed. Thus, a 1° C. increase in temperature increases the yield by a factor of 1.25, while a 10° C. increase in temperature, in the range of 15 to 25° C., increases the yield by a factor of 9.3. The $C_8$ perfluorochlorocarboxylic acid is more efficacious than the $C_6$ acid insofar as yields are concerned, and this is particularly true when the $C_8$ acid is used in the higher concentrations.

Increasing the temperature of the reaction decreases the solution viscosity, and the superiority of the $C_8$ acid over the $C_6$ acid decreases with increasing temperatures of polymerization. There is no detectable difference between the buffers employed.

EXAMPLE 4

This examples illustrates the advantageous use of the buffer sodium monohydrogen orthophosphate in the polymerization of $CF_2{=}CFCl$ using a persulfate-perfluorochlorocarboxylic acid promoter system.

A polymerization vessel was charged with 300 parts of deionized water, 2.4 parts of potassium persulfate and 4.50 parts of the potassium salt of $$Cl(CF_2{-}CFCl)_3CF_2COOH$$

and 2.4 parts of $Na_2HPO_4$. The intial pH was measured and found to be 8.3. The polymerization reaction was carried out for 20 hours at a temperature of 20° C. following the general procedure of Example 1, above. A 70.0 percent yield of polychlorotrifluoroethylene, having a 0.75 percent solution viscosity value of 1.152, was obtained. The final pH of the system was 6.8. When the polymerization is conducted in the absence of $Na_2HPO_4$, an initial pH value of 7 drops to a final pH value of 3. Thus, in order to keep corrosion problems at a minimum, it is preferable to use sodium orthophosphate (or borax) as a buffer.

EXAMPLE 5

Chlorotrifluoroethylene was copolymerized with vinylidene fluoride using the following recipe:

| | Parts by weight |
|---|---|
| Water | 200.0 |
| $CF_2{=}CFCl$ | 32.6 |
| $CF_2{=}CH_2$ | 33.8 |
| $K_2S_2O_8$ | 1.0 |
| $Cl(CF_2{-}CFCl)_3CF_2COOH$ | 0.75 |

The 0.75 part of perfluorochlorocarboxylic acid was dissolved in 100 parts of deionized water by neutralizing the acid with a 2.5 percent potassium hydroxide solution to pH 7. This solution was diluted to 150 parts and frozen in a stainless steel bomb after which 100 parts of water, containing 1 part of potassium persulfate, were added to the bomb, the contents of which were refrozen, and 32.6 parts of chlorotrifluoroethylene and 33.8 parts of vinylidene fluoride, representing a total monomer charge containing 35 mole percent of chlorotrifluoroethylene and 65 mole percent of vinylidene fluoride, were also charged to the bomb. The bomb was closed, warmed to a temperature of +5° C. and tumbled for 24 hours. The residual monomers were vented from the bomb and the polymeric latex was discharged, coagulated with sodium chloride-acid solution, filtered, washed with cold water and then hot, and dried in vacuo at a temperature of 35° C. A 41 percent yield of a chlorotrifluoroethylene-vinylidene fluoride copolymer was obtained having a 0.75 percent solution viscosity value, as determined in a 3,5-dichlorobenzotrifluoride solvent, of 1.164 centistokes.

EXAMPLE 6

A series of runs was made to determine the effect of the surface tension of the aqueous polymerization system upon the yield of polymer produced.

The following recipe was used to conduct the polymerizations:

| | Parts by weight |
|---|---|
| $CF_2{=}CFCl$ | 100.0 |
| Water | 300.0 |
| Potassium persulfate | 2.4 |
| $Na_2HPO_4{\cdot}12H_2O$ (buffer) | 2.4 |

Temperature, 25° C.
Time, 20 hours.

The results are as follows:

Table VI

| Run No. | $Cl(CF_2{-}CFCl)_3CF_2COOH$ (parts by weight) | Surface tension, dynes/cm.[1] | Percent yield | 0.75% solution viscosity (cs.)[2] |
|---|---|---|---|---|
| 1 | None | 69.2 | | 1.193 |
| 2 | 0.30 | 46.3 | 6.36 | 1.151 |
| 3 | 0.75 | 37.5 | 12.84 | 1.260 |
| 4 | 2.25 | 29.2 | 36.7 | 1.315 |
| 5 | 4.50 | 28.3 | 70.0 | 1.398 |
| 6 | 7.50 | 27.6 | 81.8 | |

[1] Surface tension measured on recipe before polymerization, without monomer.
[2] Solution viscosity measured in 3,5-dichlorobenzotrifluoride solvent.

The above data show that as the surface tension of the aqueous polymerization system is decreased, the yield of polymer product is correspondingly increased. The halogenated acid decreases the surface tension resulting in increased contact between the monomer and the aqueous phase, thereby augmenting the yield of polymer product.

A sample of polychlorotrifluoroethylene prepared in an acid-free persulfate system failed the embrittlement test after heat aging at a temperature of 190° C. for a period of three days, while the sample of polychlorotrifluoroethylene prepared using a $C_8$ telomer acid-persulfate system passed the same embrittlement test after heat aging at a temperature of 190° C. for a period of 28 days. The molecular weight of this sample, as determined by osmotic pressure measurement, was 175,000.

It will be obvious to those skilled in the art that many modifications may be made within the scope of the present invention without departing from the spirit thereof, and the invention includes all such modifications.

We claim:

1. A process which comprises polymerizing at least one but not more than two halogenated polymerizable ethylenically unsaturated monomers in the presence of a system containing substantially no added reductant being maintained at a temperature between about 5 and about 30° C. and having an initial pH between about 6 and 10 and consisting essentially of water, an inorganic peroxy compound, and a compound having the formula $$X_1(CF_2{-}CFCl)_nCF_2(CH_2)_mR$$

in which $X_1$ is selected from the group consisting of fluorine, chlorine, bromine and a perhalomethyl radical having a total atomic weight not in excess of 146.5, $n$ is an integer from 2 to 9, R is a solubilizing group, and $m$ is selected from the group consisting of 0 and 1 and is 0 only when R contains a $$-\overset{O}{\underset{\|}{C}}-O-$$

group.

2. A process which comprises polymerizing at least one but not more than two halogenated polymerizable ethylenically unsaturated monomers in the presence of a system containing substantially no added reductant, being maintained at a temperature between about 5 and about 30° C. and having an initial pH between about 6 and 10 and consisting essentially of water, an inorganic peroxide, and a compound having the formula $$X_1(CF_2{-}CFCl)_nCF_2(CH_2)_mR$$

in which $X_1$ is selected from the group consisting of fluorine, chlorine, and bromine, $n$ is an integer from 2 to 9, R is a solubilizing group, and $m$ is selected from the group consisting of 0 and 1 and is 0 only when R contains a $$-\overset{O}{\underset{\|}{C}}-O-$$

group.

3. A process which comprises polymerizing at least one but not more than two halogenated polymerizable ethylenically unsaturated monomers in the presence of a system containing substantially no added reductant, being maintained at a temperature between about 5 and about 30° C. and having an initial pH between about 6 and 10 and consisting essentially of water, an inorganic peroxide, and a compound having the formula $$Cl(CF_2-CFCl)_nCF_2-R$$

in which $n$ is an integer from 2 to 9 and R is a solubilizing group.

4. A process which comprises polymerizing at least one but not more than two halogenated polymerizable ethylenically unsaturated monomers in the presence of a system containing substantially no added reductant, being maintained at a temperature between about 5 and about 30° C. and having an initial pH between about 6 and 10 and consisting essentially of water, an inorganic peroxide, and a compound having the formula $$Cl(CF_2-CFCl)_nCF_2-COOM$$

in which $n$ is an integer from 2 to 9 and M is selected from the group consisting of metal cations and ammonium groups.

5. A process which comprises polymerizing at least one but not more than two halogenated polymerizable ethylenically unsaturated monomers in the presence of a system containing substantially no added reductant and maintained at a temperature between about 5 and about 25° C. and at an alkaline pH and consisting essentially of water, an inorganic peroxide, and between about 1 and about 10 parts per 100 parts of monomer, a compound having the formula $$Cl(CF_2-CFCl)_3CF_2-COOM$$

in which M is a metal cation.

6. A process which comprises polymerizing at least one but not more than two halogenated polymerizable ethylenically unsaturated monomers in the presence of a system containing substantially no added reductant, being maintained at a temperature between about 5 and about 30° C. and having an initial pH between about 6 and 10 and consisting essentially of water, an inorganic peroxide, and a compound having the formula $$X_1(CF_2-CFCl)_{n-1}CF_2(CH_2)_mR$$

in which $X_1$ is a perhalomethyl radical having a total atomic weight not in excess of 146.5, $n$ is an integer from 2 to 9, R is a solubilizing group, and $m$ is selected from the group consisting of 0 and 1 and is 0 only when R contains a $$-\overset{\overset{\displaystyle O}{\|}}{C}-O-$$

group.

7. A process which comprises polymerizing at least one but not more than two halogenated polymerizable ethylenically unsaturated monomers in the presence of a system containing substantially no added reductant, being maintained at a temperature between about 5 and about 30° C. and having an initial pH between about 6 and 10 and consisting essentially of water, an inorganic peroxide, and a compound having the formula $$CCl_3(CF_2-CFCl)_{n-1}CF_2-R$$

in which $n$ is an integer from 2 to 9 and R is a solubilizing group.

8. A process which comprises polymerizing at least one but not more than two halogenated polymerizable ethylenically unsaturated monomers in the presence of a system containing substantially no added reductant, being maintained at a temperature between about 5 and about 30° C. and having an initial pH between about 6 and 10 and consisting essentially of water, an inorganic peroxide, and a compound having the formula $$CCl_3(CF_2-CFCl)_{n-1}CF_2-COOM$$

in which $n$ is an integer from 2 to 9 and M is selected from the group consisting of metal cations and ammonium groups.

References Cited in the file of this patent

UNITED STATES PATENTS

| | | |
|---|---|---|
| 2,559,752 | Berry | July 10, 1951 |
| 2,612,484 | Bankoff | Sept. 30, 1952 |
| 2,613,202 | Roedel | Oct. 7, 1952 |
| 2,689,241 | Dittman | Sept. 14, 1954 |
| 2,766,215 | Stoops et al. | Oct. 9, 1956 |